(12) United States Patent
Ogawa (10) Patent No.: US 8,060,243 B2
(45) Date of Patent: Nov. 15, 2011

(54) SORTING APPARATUS (75) Inventor: Kazuhiko Ogawa, Aichi (JP)

(73) Assignee: Murata Machinery, Ltd., Kyoto (JP)

( * ) Notice: Subject to any disclaimer, the term of this patent is extended or adjusted under 35 U.S.C. 154(b) by 436 days.

(21) Appl. No.: 12/314,084

(22) Filed: Dec. 3, 2008

(65) Prior Publication Data
US 2009/0145723 A1    Jun. 11, 2009

(30) Foreign Application Priority Data

Dec. 6, 2007 (JP) .................. 2007-316275

(51) Int. Cl.
B65G 47/32 (2006.01)
(52) U.S. Cl. ........ 700/224; 700/223; 700/219; 209/552; 198/460.1; 198/502.2; 198/437; 198/358; 198/577
(58) Field of Classification Search .......... 700/213, 700/223–225; 198/418, 418.2, 418.3, 418.7, 198/570, 571, 577
See application file for complete search history.

(56) References Cited

U.S. PATENT DOCUMENTS

| | | | |
|---|---|---|---|
| 3,485,339 A | 12/1969 | Miller et al. | |
| 3,955,678 A | 5/1976 | Moyer | |
| 4,824,349 A | 4/1989 | Oku et al. | |
| 6,508,350 B1* | 1/2003 | Ouellette | 198/358 |
| 6,540,063 B1* | 4/2003 | Fallas et al. | 198/461.1 |
| 6,812,426 B1* | 11/2004 | Kotowski et al. | 209/589 |
| 6,952,628 B2* | 10/2005 | Prutu | 700/228 |
| 7,287,637 B2* | 10/2007 | Campbell et al. | 198/550.2 |
| 2004/0163929 A1* | 8/2004 | Mills | 198/438 |

FOREIGN PATENT DOCUMENTS

| | | |
|---|---|---|
| FR | 2 281 176 | 3/1976 |
| GB | 2 337 032 | 11/1999 |
| JP | 55-140414 | 11/1980 |
| JP | 02-081819 | 3/1990 |
| JP | 9-040174 | 2/1997 |
| JP | 9-208031 | 8/1997 |
| JP | 2005-112604 | 4/2005 |

OTHER PUBLICATIONS

European Search Report issued Feb. 3, 2009 in corresponding European Application No. 08021004.0.
English translation of paragraphs [0019] and [0026] of JP 9-40174, Feb. 1997.

* cited by examiner

*Primary Examiner* — Gene Crawford
*Assistant Examiner* — Kyle Logan
(74) *Attorney, Agent, or Firm* — Wenderoth, Lind & Ponack, L.L.P.

(57) ABSTRACT

A sorting apparatus includes: a characteristic information obtaining unit which obtains characteristic information of each of packages; a first branching unit to a third branching unit each of which performs branching operation for forwarding a predetermined package among the packages to a corresponding one of a first branching conveyor to a third branching conveyor; an interval adjusting unit which adjusts an interval which is a distance between two packages, which are a current package and the next package, forwarded sequentially; a branch control unit which causes each of the first branching unit to the third branching unit to change the details of branching operations according to the characteristic information; and an interval control unit which causes the interval adjusting unit to increase the interval in proportion to the time required for the branching operation for the current package.

17 Claims, 7 Drawing Sheets

| Identification number | Package information |||||
| | Characteristic information |||| Branching position |
| | Length | Width | Height | Weight | Fall possibilities | |
| P001 | 600 | 600 | 600 | 5.4 | N | 3 |
| P002 | 450 | 300 | 800 | 6.7 | Y | 1 |
| P003 | 300 | 550 | 260 | 3.5 | N | 2 |
| P004 | 380 | 350 | 720 | 11.2 | Y | 1 |
| ... | ... | ... | ... | ... | ...... | ..... |

FIG. 3B

| Identification number | Package information |||||
| | Characteristic information |||| Branching position |
| | Length | Width | Height | Weight | Fall possibilities | |
| P001 | 600 | 600 | 600 | 5.4 | 1.0 | 3 |
| P002 | 450 | 300 | 800 | 6.7 | 2.7 | 1 |
| P003 | 300 | 550 | 260 | 3.5 | 0.9 | 2 |
| P004 | 380 | 350 | 720 | 11.2 | 2.1 | 1 |
| ... | ... | ... | ... | ... | ...... | ..... |

FIG. 5

| Identification number | Length | ... | Package information ||||| 
| | | | Characteristic information |||| Branching position |
| | | | Fall possibilities | Damage possibilities | Resistance against vibration | | |
| P001 | 600 | ... | N | Y | High | 3 |
| P002 | 450 | ... | Y | N | High | 1 |
| P003 | 300 | ... | N | N | Low | 2 |
| P004 | 380 | ... | Y | N | High | 1 |
| ... | ... | ... | ... | ... | ... | ... |

SORTING APPARATUS

BACKGROUND OF THE INVENTION (1) Field of the Invention

The present invention relates to a sorting apparatus which sorts packages by forwarding each of the packages which is being carried on a main conveyor to a corresponding one of the branch conveyors.

(2) Description of the Related Art

Conventionally, there are sorting apparatuses which sort packages which are being carried on their main conveyors such as roller conveyors according to the kinds, addresses, and the like of the respective packages.

For example, such sorting apparatuses include branch conveyors branching from their main conveyors, and forward packages which are being carried on their main conveyors to the branch conveyors for classifying the respective packages. The respective packages are sorted by the sorting apparatuses which perform such branching operations in this way.

In addition, it is desired that the sorting apparatuses can handle various kinds of packages. Therefore, the sorting apparatuses are required to securely forward such various kinds of packages to corresponding branch conveyors.

In view of this, there have been proposed techniques for securely forwarding such various kinds of packages to corresponding branch conveyors irrespective of the kinds of the products (for example, see Patent Reference: Japanese Unexamined Patent Application Publication No. 9-40174).

Figure 7A:
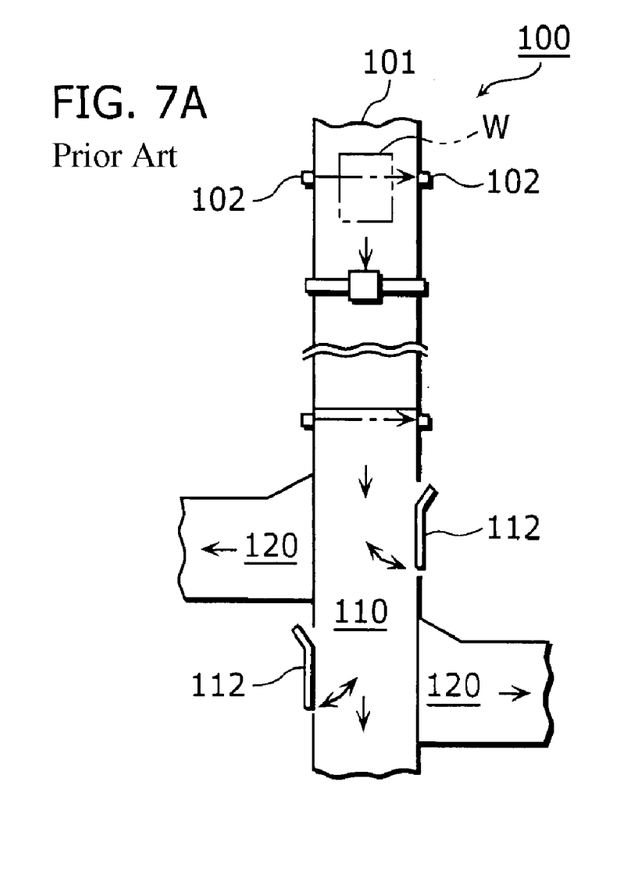
FIG. 7A is a diagram showing the outline of a conventional sorting apparatus.

FIG. 7A is a diagram showing the outline of a conventional sorting apparatus.

As shown in FIG. 7A, a conventional sorting apparatus 100 includes a photoelectric sensor 102 on a path of a carriage conveyor 101 configured as a belt conveyor.

With this photoelectric sensor 102, it is possible to measure the length in the carriage direction of a package W which is being carried by the carriage conveyor 101.

In addition, the sorting apparatus 100 includes diverters 112 each of which is intended for forwarding packages to a corresponding one of branch conveyors 120. The details of the operation of each diverter 112 is changed according to the length in the carriage direction for the package W measured by the photo electric sensor 102.

Figure 7B:
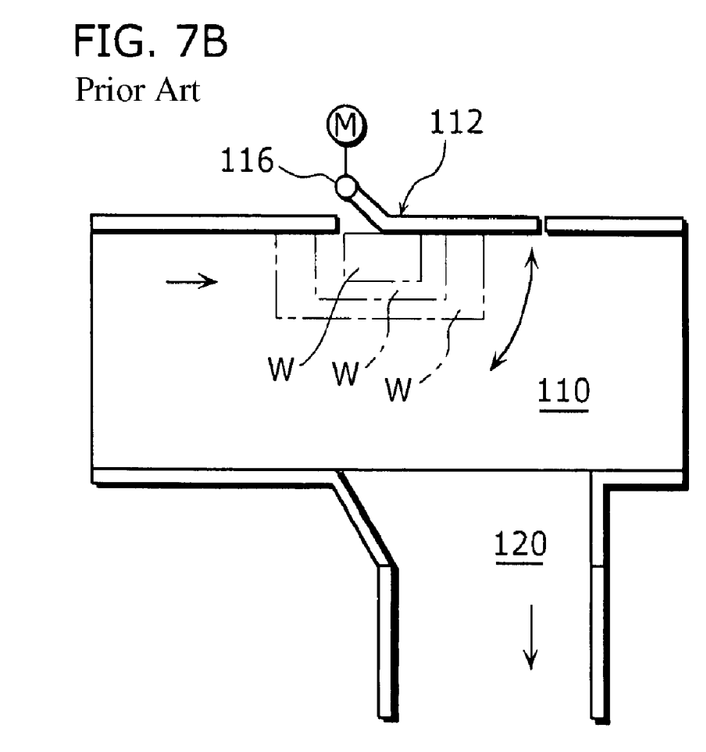
FIG. 7B is a schematic plan view, of a diverter in the sorting apparatus shown in FIG. 7A, which is prepared to show an operation starting timing of the diverter.

FIG. 7B is a schematic plan view showing the operation starting timing of the diverter 112.

When the package W on the main conveyor 110 reaches a position which is along a side of a predetermined diverter 112 and is predetermined depending on the length in the carriage direction for the package W, the diverter 112 vibrates about an axis 116 inward at a predetermined speed.

The operation starting timing of the diverter 112 at this time varies according to the length in the carriage direction for the package W as shown in FIG. 7B.

In other words, as the length in the carriage direction for the package W becomes greater, the amount of forwarding the package W becomes greater. Here, the amount of forwarding corresponds to a forwarding distance between an entrance of the main conveyor 110 and a position at which the diverter 112 starts the operation for the package W.

As described above, the sorting apparatus 100 changes the operation according to the length in the carriage direction of a package. In this way, the sorting apparatus 100 can forward packages having different lengths to the corresponding branch conveyors 120.

Here, for example, even packages having approximately the same lengths may have characteristics different in terms of fall possibilities, damage possibilities, and the like.

Thus, a package may fall even in the case of changing the operation for forwarding the package to a corresponding branch conveyor (referred to as "branching operation" hereinafter) according to the length of the package by using the above-mentioned conventional technique.

As a matter of course, a certain amount of time is required for such branching operation. Thus, when plural packages, which are a current package and the next package, are sequentially supplied to the main conveyor, it is necessary to secure a proper interval between the current package and the next package which reaches a corresponding branch point immediately after the current package so as to prevent these packages from touching each other in the middle of the branching operation of the current package.

Accordingly, a conceivable countermeasure against this is to supply packages to a main conveyor spaced apart by a sufficiently long distance when the position in the branching operation is changed according to the length of the current package as in the conventional technique. This countermeasure makes it possible to prevent packages which are being carried sequentially from touching each other as described above.

However, the use of this countermeasure greatly decreases the number of sorted packages per unit time, thereby greatly decreasing the efficiency in sorting operations.

SUMMARY OF THE INVENTION

In view of the aforementioned problems, the present invention has been made with an aim to provide a sorting apparatus for sorting plural packages, and in particular to provide a sorting apparatus for sorting various kinds of packages efficiently and safely.

In order to solve the conventional problems, the sorting apparatus, according to the present invention, which sorts packages that are carried on a main conveyor and includes: a characteristic information obtaining unit configured to obtain characteristic information of each of the packages; a branching unit configured to perform a branching operation for forwarding a predetermined package among the packages to a branch conveyor branching from the main conveyor; an interval adjusting unit configured to adjust an interval between two packages among the packages which are sequentially forwarded to the main conveyor; a branch control unit configured to cause the branching unit to change details of the branching operation according to the characteristic information obtained by the characteristic information obtaining unit; and an interval control unit configured to cause the interval adjusting unit to increase the interval between the two packages in proportion to time required for the branching operation for a preceding package of the two packages.

With this structure, details of the branching operations are changed according to the characteristics of packages. For example, the speeds or timings of the branching operations are changed. In addition, as the time required for the branching operation (referred to as branching operation requirement time hereinafter) for a current package becomes greater, the interval between the current package and the next package is made greater.

In this way, even in the case of handling various kinds of packages, the sorting apparatus according to the present invention can secure safety in the branching operations for the respective packages, and prevent packages from touching each other on the main conveyor.

Therefore, the present invention can provide a sorting apparatus which sorts various kinds of packages efficiently and safely.

In addition, the characteristic information may indicate a fall possibility of a corresponding one of the packages which is associated with the characteristic information, and the branch control unit may be configured, in the case where the fall possibility is higher than a predetermined threshold, to cause the branching unit to reduce a speed of the branching operation for the corresponding one of the packages below a speed in the case where the fall possibility is equal to or less than the predetermined threshold.

In this way, the sorting apparatus according to the present invention may change the details of the branching operation depending on whether or not the fall possibility which is a kind of characteristics of a package is higher than a predetermined threshold. By doing so, it is possible to forward a package which has been judged to have a high fall possibility to a corresponding branch conveyor in a relatively slow operation. This secures safety and efficiency in the sorting operation.

In addition, the characteristic information may indicate a fall possibility of a corresponding one of the predetermined packages, and the branch control unit may be configured to cause the branching unit to reduce a speed of the branching operation for the corresponding one of the predetermined packages in proportion to a degree of the fall possibility of the corresponding one of the predetermined packages.

In this way, the sorting apparatus according to the present invention may change the speeds of the branching operations in multiple stages according to the fall possibilities. By doing so, it is possible to handle the respective packages in the branching operations in which the branching speeds are adjusted properly for the respective packages. This increases the efficiency in the sorting operation.

In addition, the interval adjusting unit may be a sub conveyor which is disposed upstream with respect to the branch conveyors and may be able to change a carriage speed independently of the main conveyor, and the interval control unit may be configured to increase the interval between the two packages by reducing the carriage speed of the sub conveyor.

In this way, the sorting apparatus according to the present invention may adjust the intervals between packages by changing the speeds of the main conveyor. This makes it possible to perform fine adjustments of the intervals between packages without straining the packages.

Further, the present invention can be implemented as a package sorting method including these unique operations performed by the sorting apparatus according to the present invention. Furthermore, the present invention can be implemented as a control program causing the sorting apparatus to execute these unique operations.

With the sorting apparatus according to the present invention, it is possible to sort various kinds of packages having different characteristics safely and efficiently.

In this way, the sorting apparatus according to the present invention can sort even packages which cannot be sorted by a conventional sorting apparatus and thus must be sorted by operators for some reasons such as having a high fall possibility and a high damage possibility.

In other words, with the sorting apparatus according to the present invention, it is possible to automate the sorting operations for more kinds of packages than ever. Therefore, the present invention can increase the efficiency in the whole operations including sorting of packages in various fields such as distribution sites where various kinds of packages must be sorted.

FURTHER INFORMATION ABOUT TECHNICAL BACKGROUND TO THIS APPLICATION

The disclosure of Japanese Patent Application No. 2007-316275 filed on Dec. 6, 2007 including specification, drawings and claims is incorporated herein by reference in its entirety.

BRIEF DESCRIPTION OF THE DRAWINGS

These and other aims, advantages and features of the invention will become apparent from the following description thereof taken in conjunction with the accompanying drawings that illustrate a specific embodiment of the invention. In the Drawings.

DETAILED DESCRIPTION OF THE INVENTION

A sorting apparatus 10 in an embodiment of the present invention is described with reference to the drawings.

First, the structure of the sorting apparatus 10 in the embodiment is described with reference to FIGS. 1 to 3A and 3B.

Figure 1:
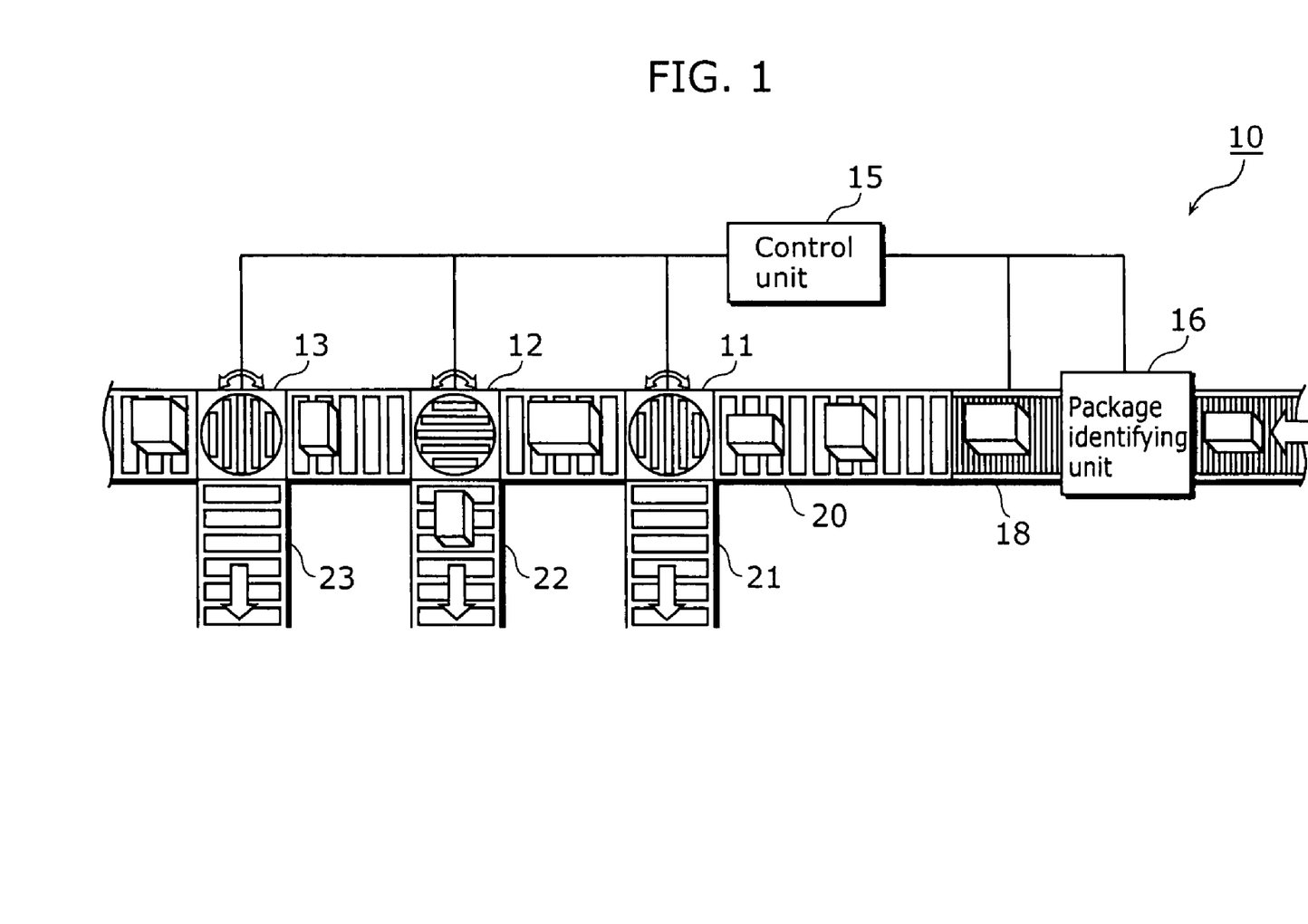
FIG. 1 is a diagram showing the outline of a sorting apparatus in an embodiment of the present invention.

FIG. 1 is a diagram showing the outline of the sorting apparatus 10 in this embodiment.

As shown in FIG. 1, the sorting apparatus 10 includes: a control unit 15; a conveyor 20; a first branch conveyor 21, a second branch conveyor 22, and a third conveyor 23 which branch from the main conveyor 20; a first branching unit 11, a second branching unit 12, and a third branching unit 13; a package identifying unit 16; and an interval adjusting unit 18.

The main conveyor 20 and each of the first branch conveyor 21 to the third branch conveyor 23 are structural elements for carrying packages. It is to be noted that the respective conveyors are roller conveyors in this embodiment, but other types of conveyors such as belt conveyors may be used instead.

Each of the first branching unit 11 to the third branching unit 13 is a structural element for forwarding predetermined packages among plural packages to the corresponding ones of the branch conveyors.

Each of the branching units employed in this embodiment is a turn-roller type direction converter which includes a turn table with rollers for rotating the turn table to change the orientations of packages.

For example, when a package is carried on the turn table of the second branching unit 12, the turn table is rotated by 90 degrees in a clockwise direction. The rotation forwards the package to the second branch conveyor 22 as shown in FIG. 1.

In this way, each of the first branching unit 11 to the third branching unit 13 can forward packages to be forwarded to a corresponding one of the branch conveyors by performing branching operations for the packages.

It is to be noted that sensors (not shown) are disposed upstream with respect to the respective branching units. Each sensor detects each package and exchanges information with the control unit 15 so that a judgment is made as to which branch conveyor is the right destination for the package.

In addition, these branching units may be direction converters other than turn-roller type direction converters; for example, these branching units may be diverter type direction converters or push type direction converters.

The package identifying unit 16 is a structural element for identifying each of the packages. More specifically, the package identifying unit 16 can obtain information about each package (which is referred to as "package information" hereinafter) from, for example, a barcode attached to each package. The package information shows the identification number, the branching position, and characteristics such as the dimensions, the style of packing, the shape, the weight, and the like.

The interval adjusting unit 18 is a structural element which adjusts an interval between two packages which are sequentially forwarded to the main conveyor 20.

In this embodiment, the interval adjusting unit 18 is an example of a sub conveyor in the sorting apparatus according to the present invention, and can change carriage speeds for packages independently of the main conveyor 20.

For example, the interval adjusting unit 18 changes the carriage speed after a current pack carried from upstream (in the right direction in FIG. 1) is forwarded to the conveyor 20 and before the next pack is forwarded to the conveyor 20. Such adjustment makes it possible to increase or decrease the interval between packages.

The interval adjusting unit 18 may adjust the interval between packages by using another method. For example, the interval adjusting unit 18 may adjust the interval between a current package and the immediately-preceding package by providing a bar which can be opened and closed on the main conveyor 20 and stops the carriage of the current package by using the bar.

The control unit 15 is a structural element which controls operations and the like of the first branching unit 11, the second branching unit 12, the third branching unit 13, and the interval adjusting unit 18, based on the characteristic information which is transmitted from the package identifying unit 16.

Figure 2:
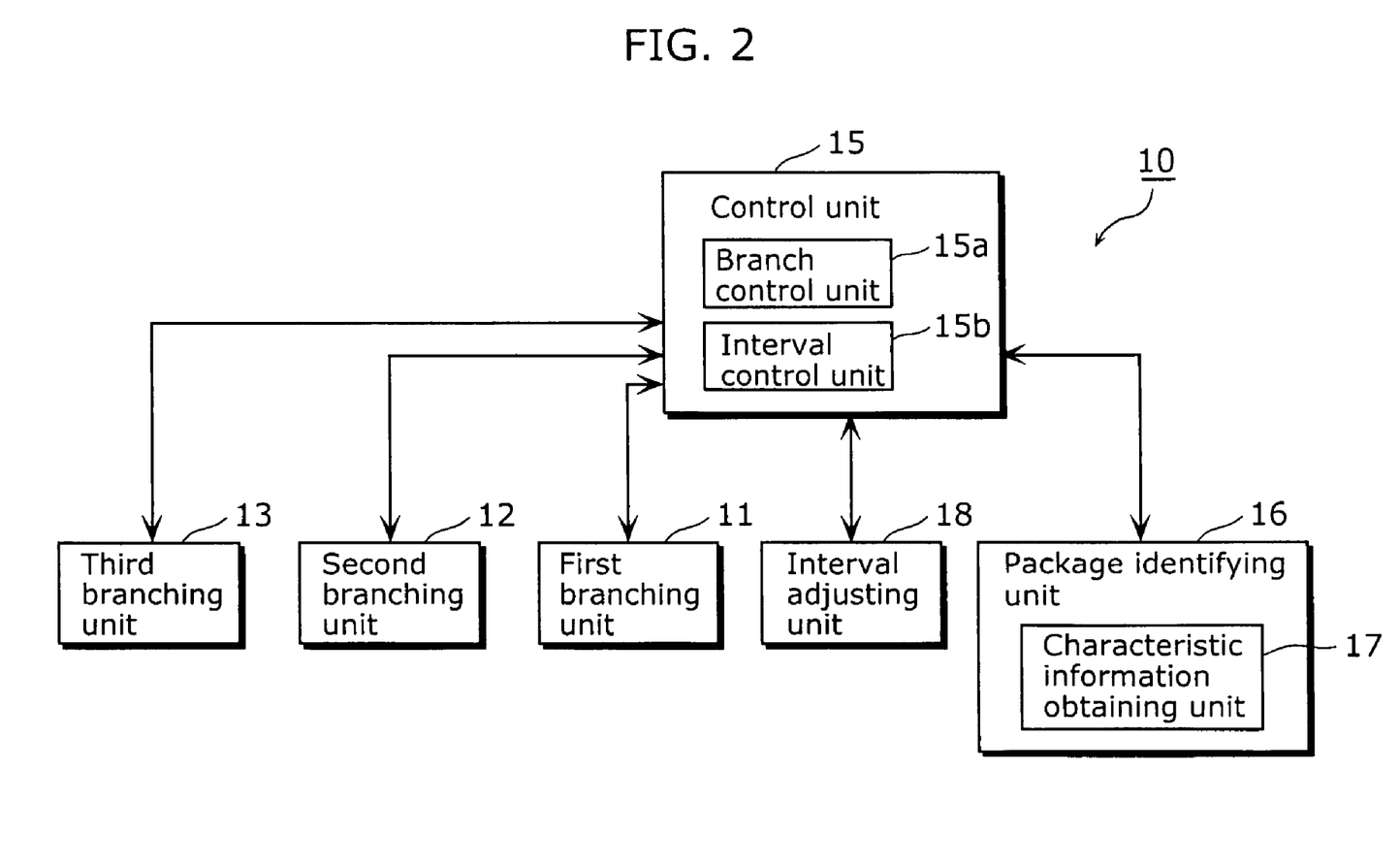
FIG. 2 is a block diagram showing main functional elements of the sorting apparatus of the embodiment.

FIG. 2 is a block diagram showing main functional elements of the sorting apparatus 10 in this embodiment.

As shown in FIG. 2, the package identifying unit 16 includes a characteristic information obtaining unit 17. The characteristic information obtaining unit 17 is a structural element which obtains characteristic information of each of the packages which are transmitted to the main conveyor 20.

The kinds of characteristic information about each package obtained by the characteristic information obtaining unit 17 include: the information indicating the dimensions such as the length, width, height and the like; the weight, the shape, and the style of packing; the information indicating the fall possibility; and the information indicating the damage possibility; and the like.

In addition, the package identifying unit 16 can obtain, from each of the packages, the information indicating the identification number and branching position for the package, in addition to the above characteristic information obtained by the characteristic information obtaining unit 17.

The package identifying unit 16 obtains the above information by, for example, reading a barcode attached to each package.

It is to be noted that another method for obtaining such information may be used instead. For example, the characteristic information obtaining unit 17 may obtain such information by receiving inputs from an operator. In addition, for example, the characteristic information obtaining unit 17 may obtain such information by using a measuring device such as an area sensor and a weighting device.

The control unit 15 includes a branch control unit 15a and an interval control unit 15b as shown in FIG. 2.

The branch control unit 15a is a structural element which controls operations of each of the first branching unit 11 to the third branching unit 13.

More specifically, the branch control unit 15a causes each of the first branching unit 11 to the third branching unit 13 to change the details of the branching operations according to the characteristic information obtained by the characteristic information obtaining unit 17.

The interval control unit 15b is a structural element which causes the interval adjusting unit 18 to adjust the interval between packages.

More specifically, the interval control unit 15b causes the interval adjusting unit 18 to increase the interval between a current package and the next package which are sequentially forwarded to the main conveyor 20, in proportion to the length in branching operation requirement time for the current package.

It is to be noted that the control unit 15 receives, from the package identifying unit 16, the information indicating the identification number and branching position of each package, in addition to the aforementioned characteristic information, and holds it as package information.

Figure 3A:
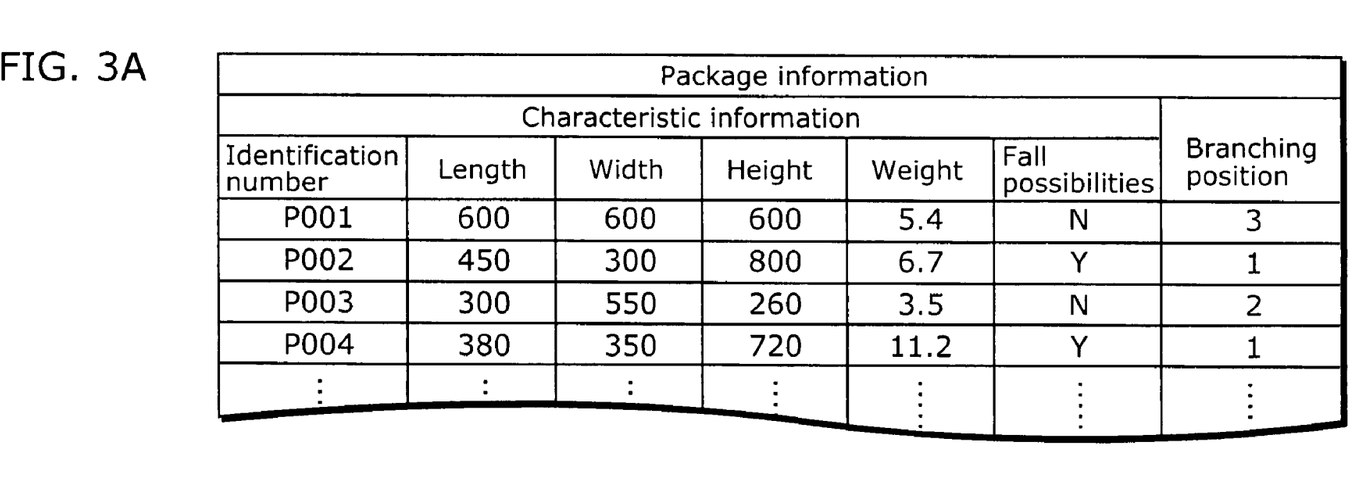
FIG. 3A is a diagram showing a first exemplary package information held by a control unit in the embodiment.

FIG. 3A is a diagram showing a first exemplary package information held by the control unit 15.

As shown in FIG. 3A, the control unit 15 receives, from the characteristic information obtaining unit 17, the characteristic information of each of the packages identified based on the identification number, and holds, as the package information, the characteristic information together with the information indicating the identification number and branching position.

It is to be noted that the "length" held as the characteristic information is the length in the carriage direction of each package, and likewise, the "width" is the length of the package in a direction which is vertical to the carriage direction for the package and parallel to the carriage surface of the main conveyor 20.

In addition, the numerals 1 to 3 in the column of "branching positions" correspond to the first branch conveyor 21 to the third branch conveyor 23, respectively.

Here, "Y" and "N" in the column of "fall possibilities" shown in FIG. 3A are indicators of fall possibilities. More specifically, "Y" indicates that a package assigned with "Y" has a high fall possibility, and "N" indicates that a package assigned with "N" has a low fall possibility.

The indicator for each package, either "Y" or "N", is determined by comparing, with a predetermined threshold, the value indicating the fall possibility calculated based on the dimensions of the package. In addition, the information indicating the determined indicator of "Y" or "N" is converted into a code and is included in the barcode attached to the package.

The characteristic information obtaining unit 17 can read the indicator of "Y" or "N" indicating the fall possibility of each package from the barcode attached thereto.

It is to be noted that an operator may input, for each package, the information indicating "Y" or "N" into the package identifying unit 16, and the control unit 15 may determine the information indicating "Y" or "N" by comparing the dimensions, the weight, the gravity center position, the shape, and the like with corresponding predetermined thresholds.

Based on the information obtained from the characteristic information obtaining unit 17, the branch control unit 15a causes the branching unit to perform branching operation for a package having a fall possibility "Y" at a reduced speed so as to forward the package to a corresponding branch conveyor.

For example, it is assumed that the package assigned with the identification number P002 (the package is referred to as package P002 hereinafter) has a fall possibility "Y" and a branching position "1".

Thus, the branch control unit 15a reduces, to the speeds slower than normal, the rotation speeds of the turn table and each roller of the turn table at the time when the first branching unit 11 forwards the package P002 to the first branch conveyor 21.

For example, the branch control unit 15a controls the speed of the branching operation determined based on these rotation speeds to the half of a reference speed which is the speed at which a package having a fall possibility "N" can be forwarded to the corresponding branch conveyor without being turned over.

Further, the branch control unit 15a calculates the branching operation requirement time for a current package. For example, here, it is assumed that the branching operation requirement time is 1.5 seconds in the case where the branching operation is performed at the reference speed.

In the case where the branching operation speed is reduced to the half as mentioned above under this assumption, the branch control unit 15a calculates the branching operation requirement time for the package having a fall possibility "Y" to be 3.0 seconds obtained by multiplying 1.5 seconds with 2.

In addition, the fall possibilities may be indicators represented in form of numerical values, instead of the two-level indicators of "Y" and "N".

Figure 3B:
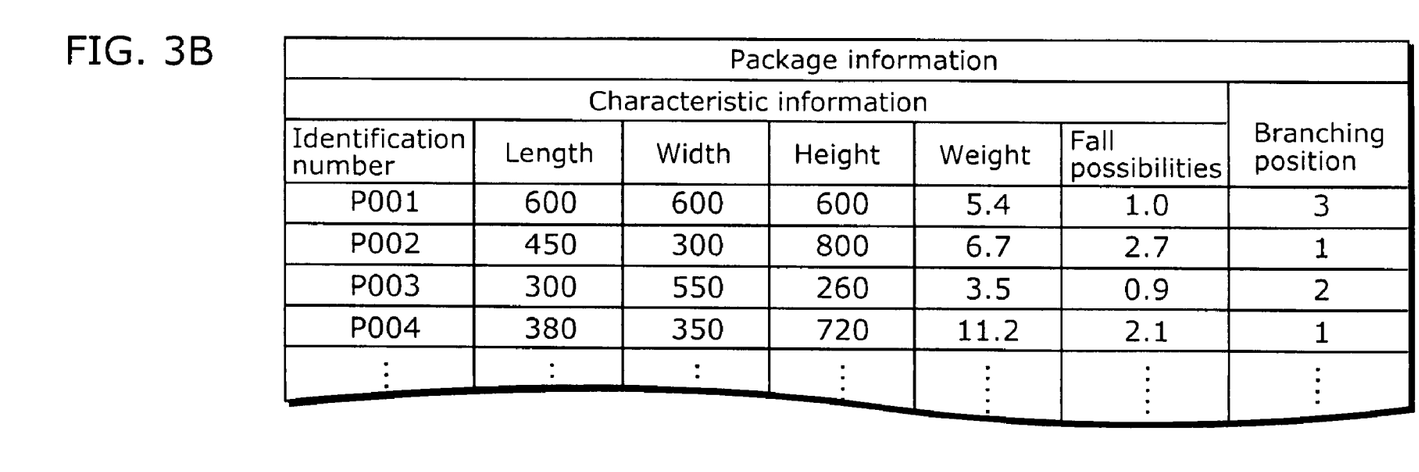
FIG. 3B is a diagram showing a second exemplary package information held by the control unit in the embodiment.

FIG. 3B is a diagram showing a second exemplary package information held by the control unit 15.

As shown in FIG. 3B, the fall possibility of each package is represented in form of a numerical value. For example, the control unit 15 calculates the fall possibility based on the dimensions of the package.

In the example shown in FIG. 3B, the fall possibility is a value indicating the ratio of (i) the shorter one of the length and the width, and (ii) the height. In other words, fall possibilities become greater as the heights become greater and the shorter ones of the lengths and the widths become shorter.

The branch control unit 15a compares the fall possibilities calculated in this way with a threshold (for example, 1.0). The branch control unit 15a further causes the branching unit to reduce the branching operation speed for a package having a fall possibility exceeding the threshold so as to forward the package to a corresponding branch conveyor.

For example, the branch control unit 15a causes the branching unit to reduce the branching operation speed to the half of the reference speed at which the branching unit can forward a package having a fall possibility equal to or less than 1.0 to the corresponding branch conveyor without falling.

In addition, the branch control unit 15a calculates the branching operation requirement time for each package. For example, in the case where the branching operation requirement time is 1.5 seconds when the branching operation is performed at the reference speed, and the branching operation speed is reduced to the half of the reference speed as mentioned above, the branch control unit 15a calculates the branching operation requirement time for a package having a fall possibility exceeding 1.0 to be 3.0 seconds obtained by multiplying 1.5 seconds with 2.

Otherwise, the branch control unit 15a may cause each branching unit to reduce the branching operation speeds as the fall possibilities of packages become higher.

For example, the branch control unit 15a causes the branching unit to reduce the branching operation speed to the speed indicated by the value obtained by dividing the reference speed by a numerical value indicating the fall possibility.

In addition, the branch control unit 15a calculates the branching operation requirement time for the package obtained by multiplying (i) the branching operation requirement time in the case where the branching operation is performed at the reference speed with (ii) the numerical value indicating the fall possibility.

For example, the branch control unit 15a determines the branching operation speed for the package P002 having a fall possibility of 2.7 to be 1/2.7 of the reference speed. In this case, the branching operation requirement time is approximately 4 seconds obtained by multiplying 1.5 with 2.7.

It is to be noted that the branch control unit 15a may change the branching operation speed according to the fall possibility, and the like for a package having a fall possibility equal to or less than the threshold.

For example, the branch control unit 15a causes the branching unit to reduce the branching operation speed to the speed indicated by the value obtained by dividing the reference speed by 0.9 for the package which is assigned with the identification number P003 (the package is referred to as package P003 hereinafter) and has a fall possibility of 0.9.

In other words, the branch operation speed may be higher than normal for a package which is highly resistant against vibration.

In this case, when the branching operation requirement time for a package is 1.5 seconds in the case where the branching operation is performed at a reference speed, the branching operation requirement time for the package P003 is approximately 1.4 seconds obtained by multiplying 1.5 with 0.9.

The branching operation requirement time for each package calculated by the branch control unit 15a according to the above-described procedure is used by the interval control unit 15b when the interval control unit 15b controls the interval adjusting unit 18.

More specifically, as a principle, when two packages, which is a current package and the next package, are sequentially forwarded to the main conveyor 20, the interval between the two packages is increased in proportion to the length of the branching operation requirement time for the current package.

This prevents the two packages from touching each other at the branching position at which the current package is forwarded to a corresponding branch conveyor.

Next, the outline of operations performed by the sorting apparatus 10 in this embodiment is described with reference to FIG. 4.

Figure 4:
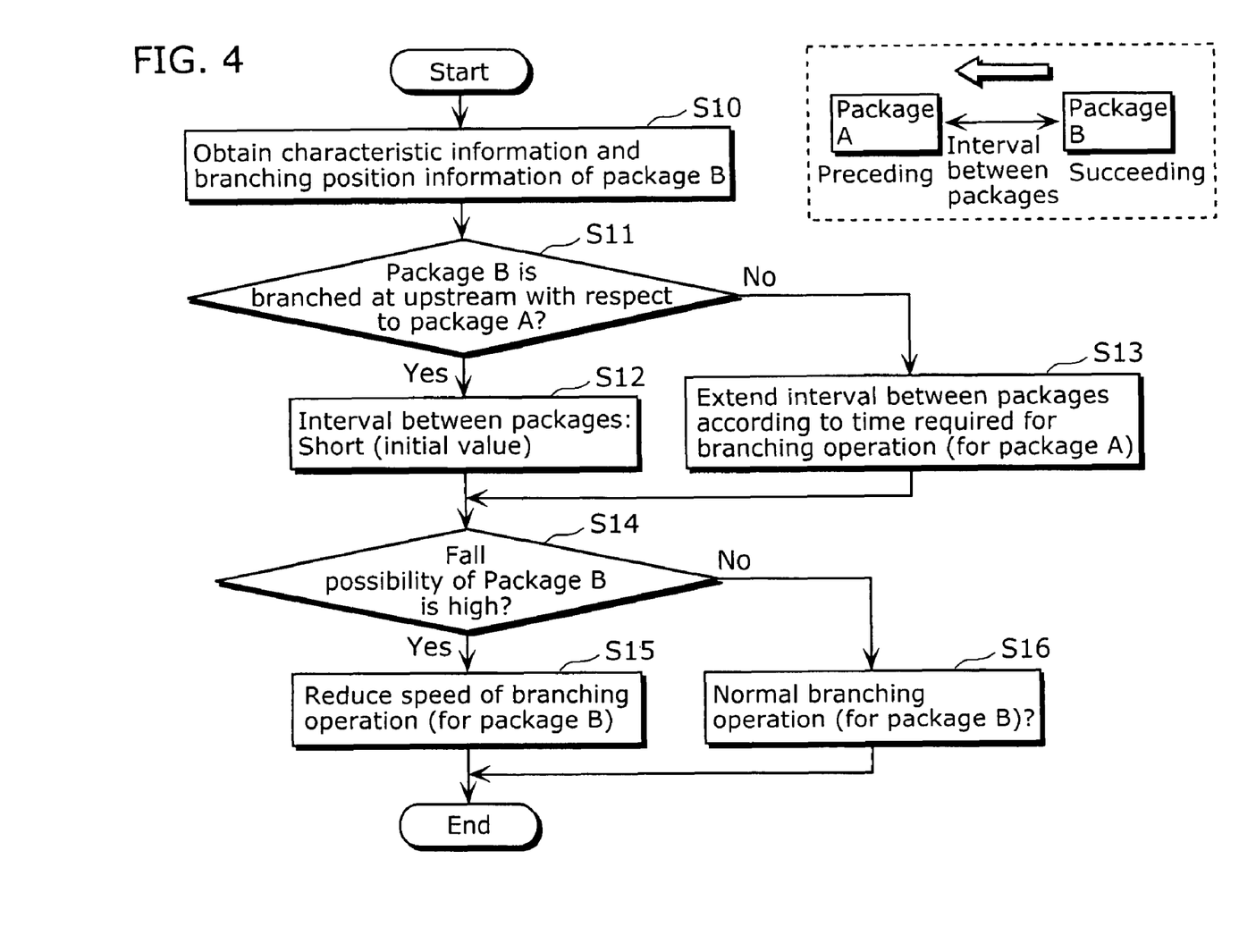
FIG. 4 is an operation flowchart of the sorting apparatus of the embodiment.

FIG. 4 is a flowchart of operations performed by the sorting apparatus 10 in this embodiment.

It is to be noted that this example describes operations performed by the sorting apparatus 10 in the case where a package A and a package B are sequentially forwarded to the main conveyor 20.

Here, focus is placed on the operations that the sorting apparatus 10 performs on the package B after the package A is forwarded from the package identifying unit 16 to the main conveyor 20.

The package identifying unit 16 obtains information indicating the identification number and branching position for the package B, and the characteristic information of the package B (step S10). These information items are sent to the control unit 15.

The interval control unit 15b of the control unit 15 compares the branching positions for the package A and the package B (step S11). In the case where the branching position for the package B is set upstream with respect to the branching position for the package A (Yes in step S11), in other words, in the case where the package B is forwarded to a corresponding branch conveyor before the package A is forwarded to a corresponding branch conveyor, the package B does not remain on the main conveyor 20 any more at the time when the branching operation for the package A is performed. Accordingly, there is no possibility that the package A and the package B touch each other during the branching operation for the package A.

Therefore, no problem arises even when the interval between the package A and the package B is short. Accordingly, the interval control unit 15b causes the interval adjusting unit 18 to forward the package B to the main conveyor 20 spaced apart by a short distance from the package A (step S12).

More specifically, the interval control unit 15b instructs the interval adjusting unit 18 to forward the package B to the main conveyor 20 such that the interval between the package A and the package B is a predetermined relatively short distance.

The interval adjusting unit 18 changes the speed of the main conveyor to the speed indicated by a value corresponding to the predetermined distance according to the instruction.

Here, it is assumed that the minimum distance conceivable as the interval is set in the interval adjusting unit 18 as the initial value, in other words, the speed of the main conveyor is set at a speed corresponding to the minimum distance. In this case, the interval adjusting unit 18 forwards the package B to the main conveyor 20 without changing the carriage speed of the main conveyor.

In addition, in the case where the branching position for the package B is set downstream with respect to the branching position for the package A (No in step S11), the package B is approaching the branching position for the package A while the branching operation for the package A is being performed. Accordingly, it is necessary to set an interval enough to prevent the package A and the package B from touching each other.

For this, the interval control unit 15b causes the interval adjusting unit 18 to increase the interval in proportion to the branching operation requirement time for the package A (step S13).

For example, it is assumed that the package A is the package P002 shown in FIG. 3B, and the package B is the package P003.

In this case, the branching position for the package P002 is "1". In other words, the package P002 is to be forwarded to the first branch conveyor 21 by the first branching unit 11.

In addition, the branching position for the package P003 is "2". In other words, the package P003 is to be forwarded to the second branch conveyor 22 by the second branching unit 12.

Accordingly, the branching position for the package P003 is set downstream with respect to the branching position for the package P002. Therefore, it is necessary to set an interval enough to prevent the package P002 and the package P003 from touching each other.

Thus, the interval control unit 15b refers to the branching operation requirement time calculated by the branch control unit 15a.

Here, it is assumed that the branching operation requirement time for the package P002 is 4 seconds as mentioned above, and the carriage speed of the main conveyor 20 is 0.5 m per second. In this case, the interval adjusting unit 18 is caused to set the interval (for example, 2.1 m) equal to or greater than 2.0 m (obtained by multiplying 0.5 m with 4 seconds).

According to the instruction by the interval control unit 15b, the interval adjusting unit 18 adjusts the speed of the main conveyor 20 so that the interval between the package P002 and the package P003 can be 2.1 m, after the package P002 is forwarded to the main conveyor 20.

The package P003 is carried through the interval adjusting unit 18 at this adjusted speed, and thus the interval between the package P002 and the package P003 becomes 2.1 m.

In this way, when two packages, which are a current package and the next package, are sequentially forwarded to the main conveyor 20, the interval adjusting unit 18 of the sorting apparatus 10 increases the interval between these two packages in proportion to the length of the branching operation requirement time for the preceding one of the two packages.

This prevents the two packages from touching each other at the branching position at which the preceding one of the two packages is forwarded to the branch conveyor. This prevents a trouble that packages touch each other and thereby falling or damaged.

In addition, the branch control unit 15a of the control unit 15 judges whether or not the fall possibility of the package P003 (package B) is high (step S14).

When the fall possibility of the package P003 is "0.9" and the threshold is "1" as shown in FIG. 3B, the package P003 is not a package having a high fall possibility (No in step S14).

Hence, the branch control unit 15a causes the second branching unit 12 to forward the package P003 to the second branch conveyor 22 by performing a normal branching operation (step S16).

In this case, for example, when it takes 1.5 seconds as the branching operation requirement time for forwarding a package having a fall possibility of 1.0 without falling, the branching operation for the package P003 is completed in 1.5 seconds.

Otherwise, the branch control unit 15a causes the second branching unit 12 to complete the branching operation for the package P003 more quickly than normal as mentioned above. For example, the branch control unit 15a causes the second branching unit 12 to complete the branching operation for the package P003 in approximately 1.4 seconds by multiplying 1.5 with 0.9.

The branching operation requirement time for the package P003 calculated in this way is used for control of the interval between the package P003 and the immediately-succeeding package which is forwarded to the main conveyor 20 next to the package P003.

Here, in the case where the fall possibility of the package B which is the succeeding package is high (Yes in step S14), the branching operation speed for the package B is reduced (step S15).

For example, in the case where the package B is a package assigned with the identification number P004 (which is referred to as the package P004 hereinafter) shown in FIG. 3B, the fall possibility is "2.1". In other words, when the threshold is assumed to be "1", the package P004 is a package having a high fall possibility.

In addition, the branching position for the package P004 is "1". In other words, the package P004 is the package which should be forwarded to the first branch conveyor 21 by the first branching unit 11.

Accordingly, the branch control unit 15a causes the first branching unit 11 to reduce the speed of the branching operation to the half of the normal speed. In this case, the branching operation requirement time is 3.0 seconds which is twice the normal time of 1.5 seconds.

As another example, in the case where the fall possibility of a package is 2.1, the branch control unit 15a causes the first branching unit 11 to reduce the speed of the branching operation to the 1/2.1 of the normal speed by using the numerical value of "2.1". In this case, the branching operation requirement time is approximately 3.2 seconds obtained by multiplying 2.1 with 1.5.

The branch control unit 15a causes the second branching unit 12 and the third branching unit 13 to change the details of the branching operations according to the fall possibilities of the packages to be forwarded to the corresponding branch conveyors.

It is to be noted that the above-described characteristic information, implementations of branching operations, numerical values, and the like are mere examples which have been given by way of illustration only and thus do not limit the present invention.

For example, although it has been described that the fall possibilities shown in FIG. 3B are calculated based on the dimensions such as the lengths of the respective packages, the fall possibilities may be calculated based on the shapes, weights, or gravity center positions of the respective packages. Otherwise, the degrees of the fall possibilities may be determined based on these information items.

In addition, the methods for calculating the changed speeds of branching operations are not limited to the above-described methods such as the method of simply reducing the speed to the half of the reference speed and the method of dividing the reference speed by the value indicating a fall possibility.

For example, it is good that the control unit 15 holds an association table of fall possibilities and the speeds of branching operations, and determines the changed speeds of branching operations based on the association table.

In addition, for example, the details of branching operations may be changed according to the characteristic information other than fall possibilities.

Figure 5:
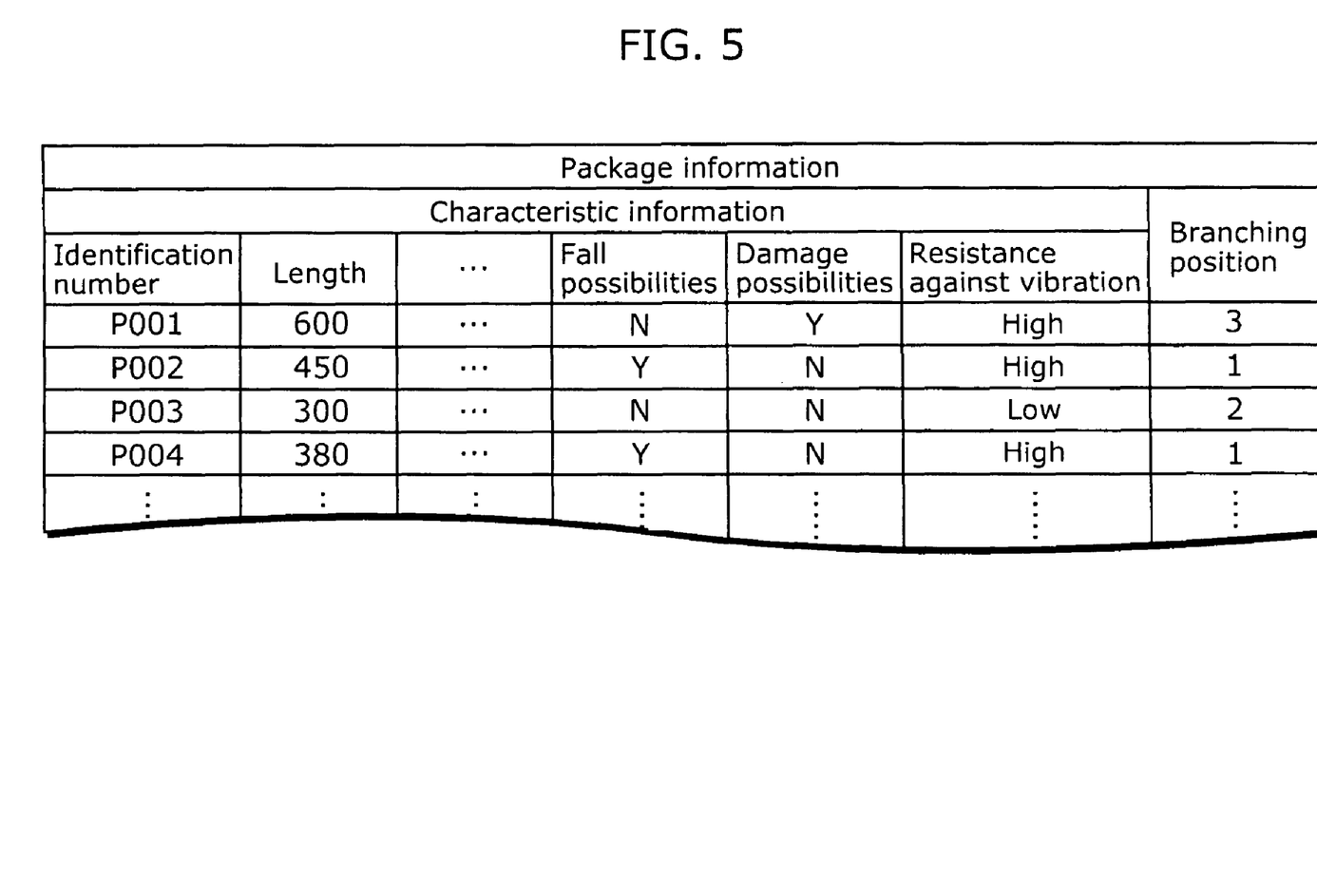
FIG. 5 is a diagram showing a third exemplary package information held by the control unit of the embodiment.

FIG. 5 is a diagram showing a third exemplary package information held by the control unit 15.

The package information shown in FIG. 5 includes, as such characteristic information, "damage possibilities" and "resistances against vibration".

The damage possibilities are information items indicating the degrees of damage possibilities of packages. For example, a damage possibility "Y" is assigned to a package having a high damage possibility. Examples of such package include a package in which a glass product is contained and a package wrapped with a weak paper. In contrast, a damage possibility "N" is assigned to a package having a low damage possibility.

The resistances against vibration are information items indicating the degrees of resistances against vibration. For example, a resistance against vibration "Low" is assigned to a package which should be protected from vibration as much as possible, and a resistance against vibration "High" is assigned to a package which is highly resistant against vibration.

For example, these information items indicating such damage possibilities and resistances against vibration are indicated in the barcodes attached to the respective packages as in the case of the above-described fall possibilities, are read by the characteristic information obtaining unit 17, and transmitted to the control unit 15.

In addition, for example, the characteristic information obtaining unit 17 may obtain these information items by receiving inputs from an operator.

In addition, these damage possibilities and resistances against vibration may be represented as numerical values. In this case, the branch control unit 15a may change the details of branching operations for the respective packages in relation to corresponding predetermined thresholds. Otherwise, the branch control unit 15a may change the speeds of the branching operations in multiple stages determined according to the values.

In the case where damage possibilities and resistances against vibration are defined as shown in FIG. 5, for example, it can be judged that the package P001 has a high damage possibility although it has a low fall possibility and a high resistance against vibration.

Therefore, the branch control unit 15a causes the third branching unit 13 to reduce the speed of the branching operation performed by the third branching unit 13 to a speed slower than a speed employed in the case of a package which has a damage possibility "N". In this way, the third branching unit 13 can forward the package P001 to the third branch conveyor 23 without damaging the package P001.

Here, as an example, it is assumed that the first branching unit 11 to the third branching unit 13 are diverter type direction conveyors. In this case, the branch control unit 15a performs control for packages having a high damage possibility by causing each of the diverter type direction conveyors to start its vibration at a timing earlier than usual and at a reduced speed.

The sorting apparatus 10 can change the speeds of the branching operations for the respective packages taking into consideration such various kinds of characteristic information items.

In addition, in the consideration of such characteristic information items, the branch control unit 15a may perform control for a package having a high fall possibility and a high damage possibility so that the package is forwarded at a branching operation speed slower than a speed employed in the case of a package having a high fall possibility or a high damage possibility.

Further, the control unit 15a may generate a numerical value to be used as a guideline for changing branching operation by converting these characteristic information items into numerical values, adding weights to the respective numerical values, and summing the weighted respective numerical values, and then change the branching operation speeds based on the numerical value as the guideline.

In addition, it is not always necessary that the control unit 15a calculates the branching operation requirement time for each package. For example, each of the branching units may calculate the branching operation requirement time in the case where it operates according to the instruction from the control unit 15, and notifies the control unit 15 of the calculated branching operation requirement time for each package.

As shown in FIG. 1, it has been described in this embodiment that a single package identifying unit 16 included in the sorting apparatus 10 sequentially obtains items of information such as characteristic information assigned to each of packages.

However, the sorting apparatus 10 may include several package identifying units 16.

Figure 6A:
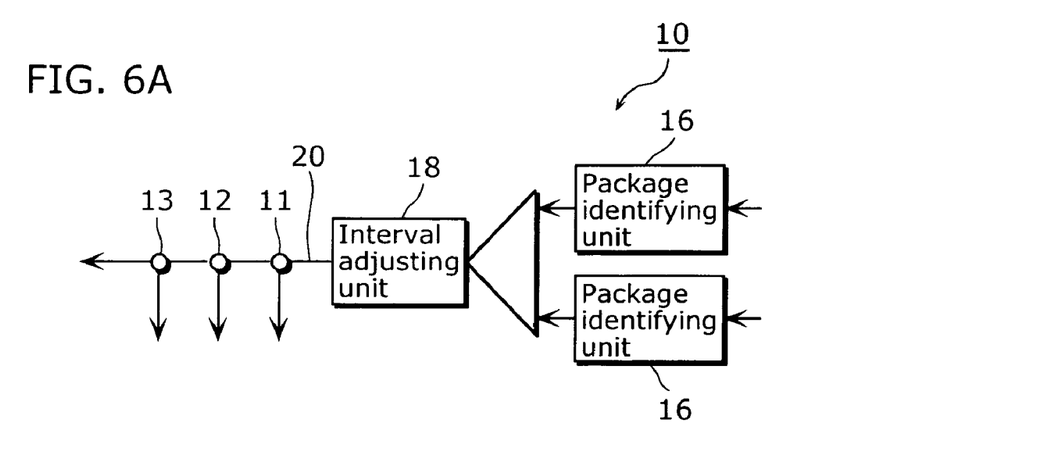
FIG. 6A is a schematic structural diagram showing a first exemplary sorting apparatus including plural package identifying units.
Figure 6B:
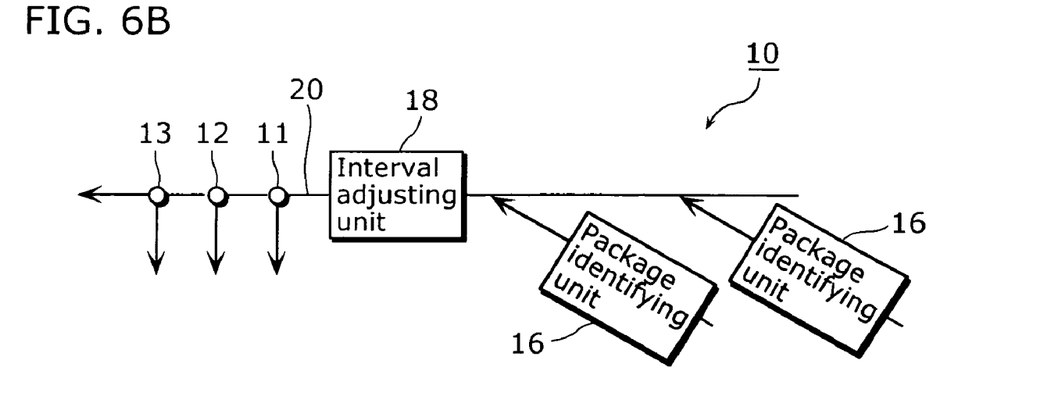
FIG. 6B is a schematic structural diagram showing a second exemplary sorting apparatus including plural package identifying units.

Each of FIG. 6A and FIG. 6B is a schematic diagram showing the structure of an exemplary sorting apparatus 10 including several package identifying units 16.

For example, as shown in FIG. 6A, the sorting apparatus 10 may include several package identifying units 16 disposed in parallel to each other and forward packages to the interval adjusting unit 18.

In this case, for example, it is good that the control unit 15 (not shown in FIG. 6A) causes these package identifying units 16 to forward the packages one by one to the interval adjusting unit 18.

As another example, as shown in FIG. 6B, several package identifying units 16 may be disposed so that plural packages are merged into a path on a conveyor disposed upstream with respect to the interval adjusting unit 18.

In this case, it is good that the control unit 15 (not shown in FIG. 6B) controls the respective package identifying units 16 so as to prevent the packages to be forwarded by the package identifying units 16 from touching each other on the main conveyor.

Here is an example case where a sensor or the like is used for obtaining characteristic information such as a fall possibility of a package, and it takes a long time to obtain such characteristic information. With a set of several package identifying units 16, it becomes possible to increase the efficiency in the overall sorting operation.

In addition, it is not always necessary that the first branch conveyor 21 to the third branch conveyor 23 in this embodiment extend in a direction vertical to the main conveyor 20 as shown in FIG. 1

In addition, it is not always necessary that the main conveyor 20 and the first branch conveyor 21 to the third branch conveyor 23 forward packages in straight lines.

It is good to determine, as necessary, the shapes and carriage directions of these conveyors, and the like. In other words, the present invention is not limited by such shapes and carriage directions of these conveyors, and the like as described in this embodiment.

As described above, in the sorting apparatus 10 in this embodiment, the first branching unit 11 to the third branching unit 13 perform branching operations according to the characteristics of packages, and the interval adjusting unit 18 adjusts the interval between packages according to the branching operation requirement time of each package. In this way, the present invention can provide the following usable advantageous effects.

The sorting apparatus 10 according to the present invention can slowly forward packages which should not be forwarded quickly to branch conveyors by causing the respective branching units to change the details of the branching operations according to the characteristics of the respective packages.

In addition, when two packages, which are a package which should not be forwarded quickly to a branch conveyor and the next package, are forwarded in the main conveyor, the sorting apparatus 10 can increase the interval between these two packages than usual and thereby preventing these packages from touching each other at the branching position for the current package.

Accordingly, the sorting apparatus 10 can handle even packages which cannot be sorted by a conventional sorting apparatus and thus must be sorted by operators for some reasons such as having a high fall possibility and/or a high damage possibility.

In other words, the sorting apparatus 10 can perform sorting operations for various kinds of packages which cannot be mechanically sorted by any conventional sorting apparatus.

Thus, for example, the sorting apparatuses 10 according to the present invention make it possible to increase the efficiency in the overall sorting operations for packages in various fields such as physical distribution sites where various kinds of packages must be sorted.

It is to be noted that the sorting apparatus 10 can perform control for packages which can be forwarded quickly because of their stability so that these packages are forwarded to branch conveyors at branching operation speeds faster than usual and at intervals shorter than usual.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

A sorting apparatus according to the present invention can be used as an apparatus which sorts various kinds of packages. Therefore, the sorting apparatus is useful as a sorting apparatus and the like used in distribution sites where various kinds of packages must be sorted.

What is claimed is:

1. A sorting apparatus which sorts packages that are carried on a main conveyor, said sorting apparatus comprising:
a characteristic information obtaining unit configured to obtain characteristic information of each of the packages;
a branching unit configured to perform a branching operation for forwarding a predetermined package among the packages to a branch conveyor branching from the main conveyor;
an interval adjusting unit configured to adjust an interval between two of the packages, the two packages being a preceding package and a succeeding package which are sequentially forwarded to the main conveyor;
a branch control unit configured to cause said branching unit to change a speed of the branching operation for forwarding the preceding package to the branch conveyor according to the characteristic information of the preceding package obtained by said characteristic information obtaining unit, and to cause said branching unit to change a speed of the branching operation for forwarding the succeeding package to the branch conveyor according to the characteristic information of the succeeding package obtained by said characteristic information obtaining unit; and
an interval control unit configured to obtain a time required for the branching operation for the proceeding package, and cause said interval adjusting unit to increase the interval between the two packages in proportion to the obtained time required for the branching operation for the preceding package.

2. The sorting apparatus according to claim 1, wherein the characteristic information indicates a fall possibility of a corresponding one of the packages which is associated with the characteristic information, wherein the branch control unit is configured to cause said branching unit to perform the branching operation at a first speed if the fall possibility is equal to or less than a predetermined threshold, and wherein the branch control unit is configured to cause said branching unit to reduce a speed of the branching operation below the first speed if the fall possibility is higher than the predetermined threshold.

3. The sorting apparatus according to claim 1, wherein the characteristic information indicates a fall possibility of a corresponding one of the predetermined packages, and wherein said branch control unit is configured to cause said branching unit to reduce a speed of the branching operation for the corresponding one of the predetermined packages in proportion to a degree of the fall possibility of the corresponding one of the predetermined packages.

4. The sorting apparatus according to claim 1, wherein said interval adjusting unit is a sub conveyor which is disposed upstream with respect to the branch conveyor and can change a carriage speed independently of the main conveyor, and wherein said interval control unit is configured to increase the interval between the two packages by reducing the carriage speed of the sub conveyor.

5. The sorting apparatus according to claim 1, wherein the characteristic information indicates a fall possibility of a corresponding one of the packages which is associated with the characteristic information, wherein the branch control unit is configured to cause said branching unit to perform the branching operation at a first speed if the fall possibility is equal to or less than a predetermined threshold, and wherein the branch control unit is configured to cause said branching unit to reduce a speed of the branching operation to a second speed if the fall possibility is higher than the predetermined threshold, the second speed being half of the first speed.

6. A sorting apparatus which sorts packages that are carried on a main conveyor, said sorting apparatus comprising:

a characteristic information obtaining unit configured to obtain characteristic information of each of the packages;

a plurality of branching units configured to perform a branching operation for forwarding the packages to a plurality of branch conveyors branching from the main conveyor;

an interval adjusting unit configured to adjust an interval between two of the packages, the two packages being a preceding package and a succeeding package which are sequentially forwarded to the main conveyor;

a branch control unit configured to cause one of the branching units to change a speed of the branching operation for forwarding the preceding package to a corresponding one of the branch conveyors according to the characteristic information of the preceding package obtained by said characteristic information obtaining unit, and to cause another of the branching units to change a speed of the branching operation for forwarding the succeeding package to a corresponding one of the branch conveyors according to the characteristic information of the succeeding package obtained by said characteristic information obtaining unit; and an interval control unit configured to obtain a time required for the branching operation for the proceeding package, and cause said interval adjusting unit to increase the interval between the two packages in proportion to the obtained time required for the branching operation for the preceding package.

7. The sorting apparatus according to claim 6, wherein the characteristic information indicates a fall possibility of a corresponding one of the packages which is associated with the characteristic information, wherein the branch control unit is configured to cause said branching units to perform the branching operations at a first speed if the fall possibility is equal to or less than a predetermined threshold, and wherein the branch control unit is configured to cause said branching units to reduce a speed of the branching operations below the first speed if the fall possibility is higher than the predetermined threshold.

8. The sorting apparatus according to claim 6, wherein the characteristic information indicates a fall possibility of a corresponding one of the packages, and wherein said branch control unit is configured to cause said branching units to reduce a speed of the branching operations for the corresponding one of the packages in proportion to a degree of the fall possibility of the corresponding one of the packages.

9. The sorting apparatus according to claim 6, wherein said interval adjusting unit is a sub conveyor which is disposed upstream with respect to the branch conveyors and can change a carriage speed independently of the main conveyor, and wherein said interval control unit is configured to increase the interval between the two packages by reducing the carriage speed of the sub conveyor.

10. The sorting apparatus according to claim 6, wherein the characteristic information indicates a fall possibility of a corresponding one of the packages which is associated with the characteristic information, wherein the branch control unit is configured to cause said branching units to perform the branching operations at a first speed if the fall possibility is equal to or less than a predetermined threshold, and wherein the branch control unit is configured to cause said branching units to reduce a speed of the branching operations to a second speed if the fall possibility is higher than the predetermined threshold, the second speed being half of the first speed.

11. The sorting apparatus according to claim 6, wherein the interval control unit causes the interval adjusting unit to increase the interval between the two packages if a branching position of the succeeding package is not upstream of a branching position of the preceding package, and wherein the interval control unit causes the interval adjusting unit not to increase the interval between the two packages if the branching position of the succeeding package is upstream of the branching position of the preceding package.

12. A sorting apparatus which sorts packages that are carried on a main conveyor, said sorting apparatus comprising:

a characteristic information obtaining unit configured to obtain characteristic information of each of the packages;

a plurality of branching units configured to perform a branching operation for forwarding the packages to a plurality of branch conveyors branching from the main conveyor;

an interval adjusting unit configured to adjust an interval between two of the packages, the two packages being a preceding package and a succeeding package which are sequentially forwarded to the main conveyor;

branch control means for causing one of the branching units to change a speed of the branching operation for forwarding the preceding package to a corresponding one of the branch conveyors according to the characteristic information of the preceding package obtained by said characteristic information obtaining unit, and causing another of the branching units to change a speed of the branching operation for forwarding the succeeding package to a corresponding one of the branch conveyors according to the characteristic information of the succeeding package obtained by said characteristic information obtaining unit; and interval control means for obtaining a time required for the branching operation for the proceeding package, and causing said interval adjusting unit to increase the interval between the two packages in proportion to the obtained time required for the branching operation for the preceding package.

13. The sorting apparatus according to claim 12, wherein the characteristic information indicates a fall possibility of a corresponding one of the packages which is associated with the characteristic information, wherein the branch control means causes said branching units to perform the branching operations at a first speed if the fall possibility is equal to or less than a predetermined threshold, and wherein the branch control means causes said branching units to reduce a speed of the branching operations below the first speed if the fall possibility is higher than the predetermined threshold.

14. The sorting apparatus according to claim 12, wherein the characteristic information indicates a fall possibility of a corresponding one of the packages, and wherein said branch control means causes said branching units to reduce a speed of the branching operations for the corresponding one of the packages in proportion to a degree of the fall possibility of the corresponding one of the packages.

15. The sorting apparatus according to claim 12, wherein said interval adjusting unit is a sub conveyor which is disposed upstream with respect to the branch conveyors and can change a carriage speed independently of the main conveyor, and wherein said interval control means increases the interval between the two packages by reducing the carriage speed of the sub conveyor.

16. The sorting apparatus according to claim 12, wherein the characteristic information indicates a fall possibility of a corresponding one of the packages which is associated with the characteristic information, wherein the branch control means causes said branching units to perform the branching operations at a first speed if the fall possibility is equal to or less than a predetermined threshold, and wherein the branch control means causes said branching units to reduce a speed of the branching operations to a second speed if the fall possibility is higher than the predetermined threshold, the second speed being half of the first speed.

17. The sorting apparatus according to claim 12, wherein the interval control means causes the interval adjusting unit to increase the interval between the two packages if a branching position of the succeeding package is not upstream of a branching position of the preceding package, and wherein the interval control means causes the interval adjusting unit not to increase the interval between the two packages if the branching position of the succeeding package is upstream of the branching position of the preceding package.

* * * * *